July 19, 1938.  W. C. WAGNER  2,123,978
FLUID METER
Filed Dec. 7, 1935  5 Sheets-Sheet 1

INVENTOR
Walter C. Wagner
BY
Augustus B. Stoughton
ATTORNEY.

July 19, 1938. W. C. WAGNER 2,123,978
FLUID METER
Filed Dec. 7, 1935 5 Sheets-Sheet 2

INVENTOR
Walter C. Wagner
BY
Augustus B. Stoughton
ATTORNEY.

WITNESS:

July 19, 1938.    W. C. WAGNER    2,123,978
FLUID METER
Filed Dec. 7, 1935    5 Sheets-Sheet 3
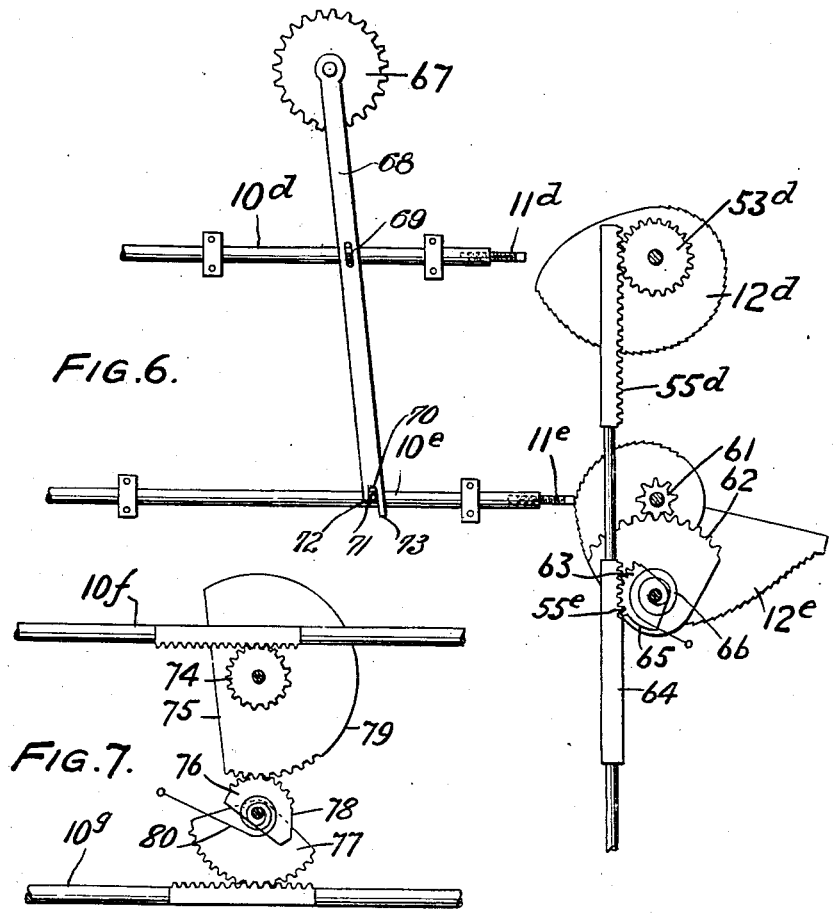
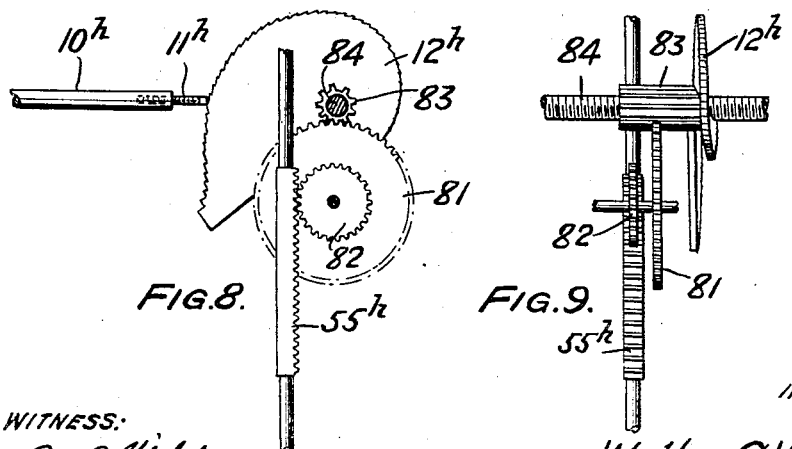
INVENTOR
Walter C. Wagner
BY
Augustus B. Stoughton
ATTORNEY.

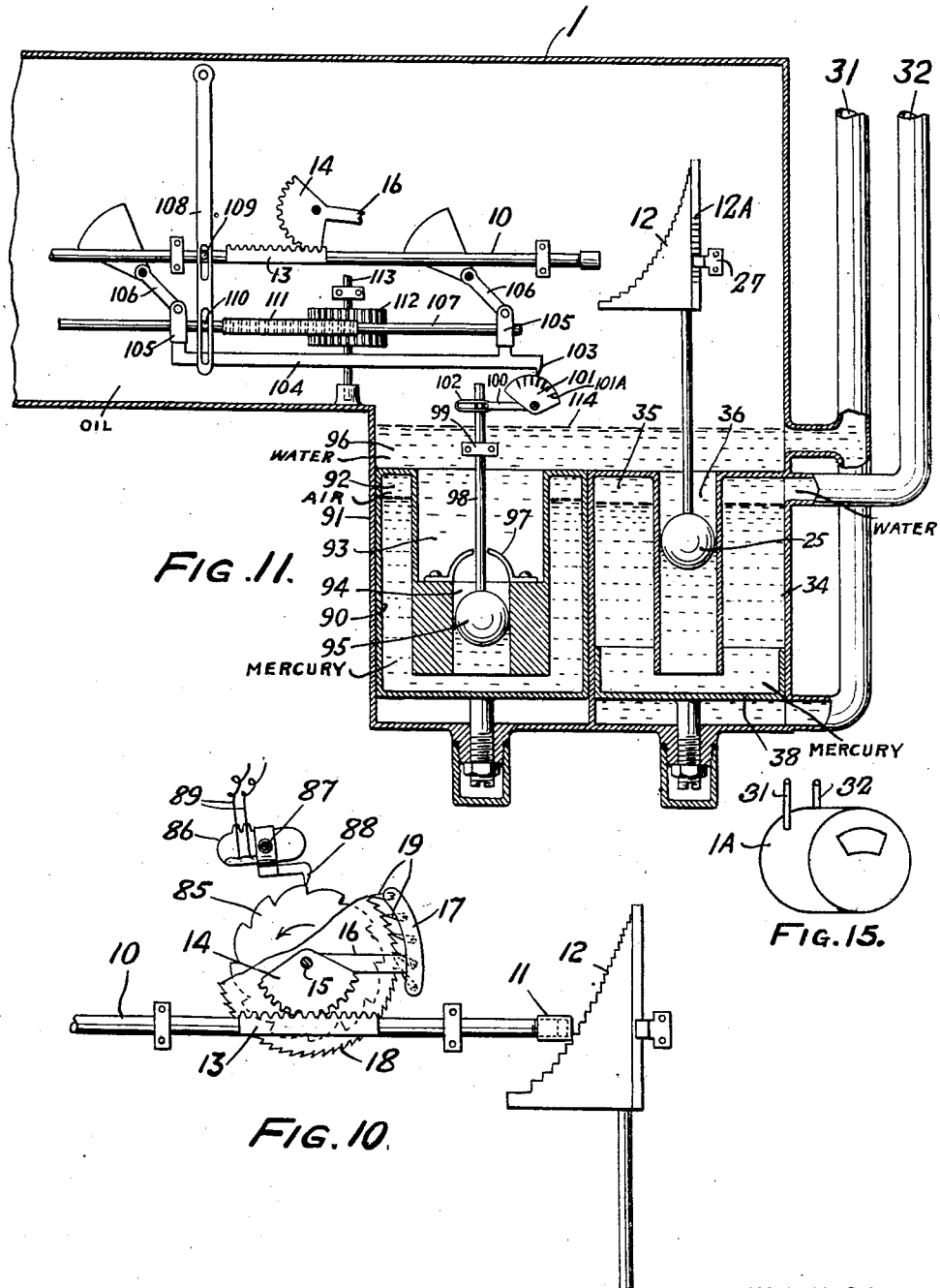

July 19, 1938.                W. C. WAGNER                2,123,978
                              FLUID METER
                        Filed Dec. 7, 1935            5 Sheets-Sheet 5

WITNESS:

INVENTOR
Walter C. Wagner
BY
Augustus B. Stoughton
ATTORNEY.

Patented July 19, 1938

2,123,978

UNITED STATES PATENT OFFICE 2,123,978

FLUID METER

Walter C. Wagner, Ardmore, Pa.

Application December 7, 1935, Serial No. 53,323

9 Claims. (Cl. 73—206)

This invention relates to metering the flow of liquids, gases and vapors, and in particular to the metering of the flow of steam.

Heretofore steam or fluid meters have been rather complicated, and their performance, particularly at light loads as related to rating, has been relatively unsatisfactory.

One object of my invention is to provide a meter built along relatively simpler lines, and which can be constructed at a lower cost than the present types.

Another object of my invention is to provide in a single meter a more accurate means of measuring down to extremely small loads.

A further object of my invention is to provide a meter which within itself will compensate for variations in the pressure of the supply.

Other objects of the invention will appear from the following description at the end of which the invention will be claimed.

My invention consists essentially of a pressure tight housing, which incloses a float connected by suitable linkages to an integrating mechanism. An extension of the principles makes possible the application of mechanical arrangements whereby in a single meter a plurality of cams can be arranged to operate in different load ranges, and to integrate their respective deflections on the same integrating mechanism.

Generally, but more specifically stated, the invention consists in an integrating registering or recording mechanism, a plunger for actuating said mechanism, means for reciprocating the plunger with a constant number of strokes per unit of time, said means including a yieldable connection, a step cam device aligned with the plunger and adapted to limit its stroke in accordance with the position of the cam device since the position of the cam device varies with the load on the meter, one or more float devices each respectively responsive either to the differential pressure across an orifice or to the upstream or absolute pressure on the orifice, connections between one of the float devices and the cam device and connections between the other float device and the plunger and the integrating registering or recording mechanism, the first mentioned connection being available for operation due to differential pressure even at low load and both of said connections being available for operation with pressure compensation, as desired.

The invention also comprises the improvements to be presently described and finally claimed.

The invention broadly and both as to details of construction and combination of parts will be best understood from the following description of specific embodiments, which will be given in connection with the accompanying drawings, in which:

Figure 6 is a modification of the cam contacting device to insure greater accuracy at low readings.

Figure 7 is a modification of Figure 6.

Figures 8 and 9 are a side and an edge view of another modification of Figure 6.

Figure 10 is a modification of Figure 1, arranged so that electrical impulses may be transmitted to a pressure compensator in accordance with my co-pending application No. 30,209 filed July 6, 1935.

Figure 11 is a modification of Figure 1 in which the differential meter herein described is mechanically combined with my pressure compensator into one meter case.

Figure 15 is a perspective view of a modified form of casing, and

Figures 1, 16:
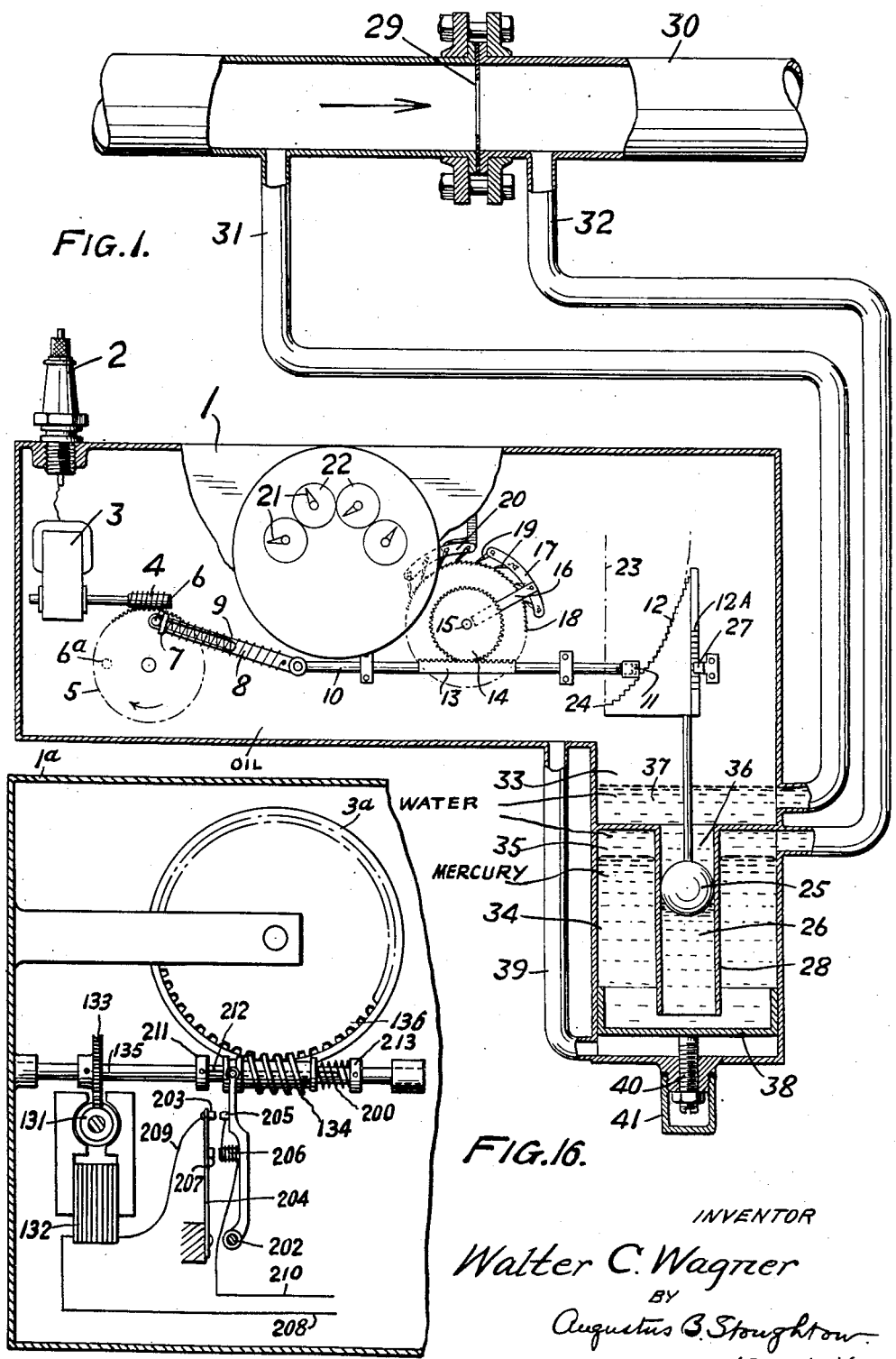
Figure 1 is a side elevation, partly in section, of a device embodying features of the invention.
Figure 16 is a modification of the device shown in Figure 13.

Referring to Figure 1, the meter consists of a pressure-tight housing 1 into which is screwed a spark plug 2, which provides a pressure-tight means of making an electrical connection to the constant-speed electric motor 3, said motor providing impulses at uniform intervals for actuating the meter register. Worm 4 mounted on the shaft of motor 3 engages worm gear 5, imparting uniform rotation to the latter. Pin 6 attached to worm gear 5 presses against loose collar 7 on connecting rod 8, and due to the compression of spring 9, pin 6 is normally constrained toward the extreme end of slot in connecting rod 8. The reciprocating motion of connecting rod 8 is imparted to the plunger rod 10 moving in guides, the extreme or contacting end of plunger 10 being fitted with an adjustable cap 11 to permit of proper zero setting. The limit of travel of plunger 10 is determined by the edge of cam 12. When contact between plunger 10 and cam 12 occurs before worm gear 5 has completed a half revolution, further motion of pin 6 is permitted by slot in rod 8 and by additional compression of spring 9 (the worm gear 5 being shown here as rotating in a clockwise direction). During the final half-revolution of worm-wheel 5, the return motion of plunger 10 commences as soon as pin 6 again reaches the end of the slot, and the cycle is completed when pin 6 returns to the starting position, shown in dotted lines at 6—A. The resultant reciprocating motion of plunger 10 is transmitted, by means of rack 13, to gear 14 turning freely on shaft 15. To gear 14 is fastened arm 16 and segment 17. The oscillating motion of segment 17 is communicated to ratchet wheel 18 by means of pawls 19, the latter being so spaced or staggered as to permit advancing ratchet wheel 18 fractional distances of one tooth. A stationary segment 20 and set of pawls, similar in construction to segment 17 and pawls 19, prevent reverse motion of ratchet wheel 18 on the return stroke of arm 16. The intermittent unidirectional rotation of ratchet wheel 18 is communicated by usual means to register dial pointers 21 which revolve in front of dials 22. Motor 3, worm 4, worm gear 5, pin 6, collar 7, spring 9, rod 8, plunger 10, rack 13, gear 14, shaft 15, arm 16, pawls 19 and ratchet-wheel 18 thus form a variable-stroke, synchronous, reciprocating, step-by-step compressible motor means.

The degree of motion of plunger 10 is limited by cam 12 whose contact edge is cut into a series of numerous small steps whose edges are, respectively, parallel and at right angles to the contacting end 11 of plunger, so that there shall be, during the time of contact between plunger and cam, no resultant force tending to bend or move either the plunger or cam in a vertical direction. The contour of cam is in the general shape of a parabola whose axis lies on the line 23 and vertex at the point 24. Vertical motion of the cam 12 is caused by float 25 floating on the surface of the mercury 26, the motion of float 25 being transmitted to cam 12 by means of the float stem. Cam 12 is provided with a vertical strip which is free to move vertically in fixed guide 27, the latter being placed so as to be horizontally opposite plunger 10, to eliminate any possible bending moment on cam 12 due to the force of contact. The lower guide is provided by the float itself, there being only a small clearance between float, and the cylindrical chamber or tube 28, so that any error introduced by lateral motion of float shall be negligible.

At all loads less than full load, contact between plunger 10 and cam 12 will occur before a half revolution of worm wheel 5 has been completed; and subsequent motion of pin 6 in the slot will, by the compression of spring 9, press plunger 10 against cam 12 with sufficient force to prevent free vertical motion of the latter after said contact has been made. There will be no registration error, since the construction insures a complete release of constraint due to said contact, after some instant during the return motion of pin 6, after which float 25 and cam 12 are free to assume a new position properly related to the level of mercury 26, previous to the next forward registration stroke of plunger 10.

The motion of float 25 is determined by the level of the liquid 26 (in this case mercury) which in turn is determined by the difference in pressure between the steam at the upstream and downstream sides of the standard orifice plate 29 which is mounted in the pipe assembly 30. The above pressure differential is then communicated by tubes or pipes 31 and 32, and thence, respectively, into the meter space 33 and the annular chamber 34. The spaces 35 and 36 in chambers, above the level of the mercury, are filled with water, as is also space 37, below the bottom line of the oil in the chamber 33—it being understood that the housing 1 is filled with oil. The chamber space 35 will then be subject to the lower pressure, and the chamber space 36, which is open at the top, will be subject to the higher pressure. The mercury level in chamber 28 will then fall, and the level in chamber 34 will rise, the two chambers being so proportioned that the greater part of the motion will occur in chamber 36, due to the relatively greater horizontal area of chamber 34.

It is understood that the above pipe connections may be reversed, depending upon the preferred orientation of cam 12, so that chambers 36 and 35 become, respectively, the low pressure and high pressure chambers, so that an increase in the pressure differential at the orifice 29 will cause the mercury in chamber 34 to fall.

By way of further explanation it may be said that as shown in Figure 1 there is a partition separating the casing into upper and lower parts 33 and 34 and 28 is an open ended tube extending through the partition and dipping into the lower part of the chamber 34.

The bottom of mercury chamber 34 is a close-fitting piston 38 which may be moved up or down to adjust the mercury level for zero load. The clearance between piston and the inner wall of the mercury chamber 34 is a minimum, to prevent leakage of the mercury past the piston. In addition, a pipe 39 communicates between the general meter space 33 and the clearance space underneath piston 38, so that the difference in pressure on opposite sides of the piston shall be no greater than the actual pressure differential being measured, plus the pressure head due to the height of the mercury column. To provide a pressure-tight seal and at the same time permit of an occasional adjustment of the mercury level, piston 38 is provided with a threaded extension 40 which is screwed through a bottom projection of chamber, and provided with a locking nut. The adjustment is covered by means of cap 41, making a pressure-tight seal.

Figure 3:
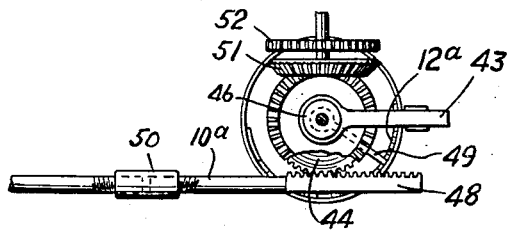
Figure 3 is a top view of Figure 2.
Figure 2:
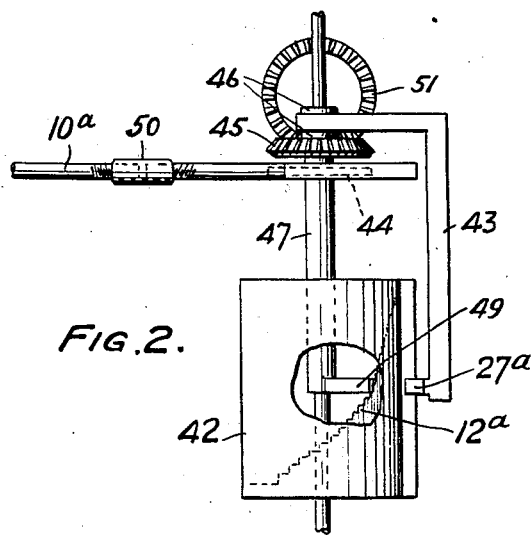
Figure 2 is a detail of a modification of the cam contacting device.

A different type of cam structure is shown in Figures 2 and 3, in which the cam 12ª, originally laid out in a shape similar to cam 12 of Figure 1, is bent into a cylindrical shape and fastened to the inner surface of the cylinder 42, the latter being fastened to the stem of the float 25 (Fig. 1) and provided with a vertical strip moving in guide 27ª of a stationary supporting bracket 43, to prevent rotation of the cylinder. Gear 44, bevel gear 45 and collars 46 are mounted on hollow spindle 47 and rotate as one unit, the upper end of bracket 43 acting as one bearing. Alignment of the spindle is insured by the float stem, which is free to move vertically thru spindle 47, the latter also acting as a bearing or upper guide for the float stem. Rack 48, fastened to the end of plunger 10ª, meshes with gear 44 so that linear motion of plunger 10ª is converted into angular motion of spindle 47 which carries at its lower end projecting finger 49 which swings around and makes contact with cam 12ª. Adjustment of the zero position of plunger 10ª is by means of the turnbuckle—coupling 50. The oscillating motion of gear 44 is transmitted thru bevel gears 45 and 51 to gear 52, which transmits its motion to the register mechanism in the same manner as is done by gear 14 in Figure 1.

Figures 4, 5:
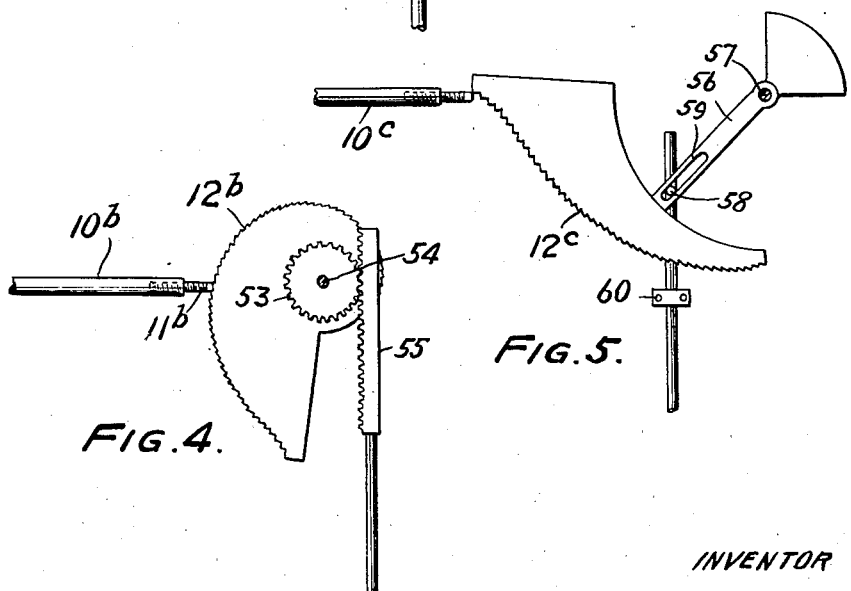
Figures 4 and 5 are details of additional modifications of the cam contacting device.

A second modification of the cam mechanism is shown in Figure 4. Here the cam 12ᵇ is laid out on polar coordinates, the edges of the steps being radii and circular arcs, but maintaining the original parabolic (or square root) relationship between the horizontal movement permitted the plunger 10ᵇ and the degree of angular motion of the cam, the latter being directly proportional to the vertical motion of float stem. Gear 53 and cam 12ᵇ are mounted on shaft 54, gear 53 meshing with rack 55 which is fastened to the float stem. Zero adjustment of the plunger 10ᵇ is made by means of screw tip 11ᵇ.

A third modification of the cam structure 12ᶜ is shown in Figure 5. The layout of the contact surface of cam 12ᶜ is basically the same as for the cam of Figure 4 except that due to the limitations of the structure of Figure 5, cam 12ᶜ is designed to be rotated thru a maximum angle not exceeding, say, 90°. Cam 12ᶜ is fastened to arm 56 which is pivoted on shaft 57, cam and arm being balanced by a counter-weight. Float stem moves arm 56 by means of pin 58 which engages slot 59. Guide 60 maintains the float stem in a fixed vertical line.

A fourth modification of the cam structure is shown in Figure 6, which permits of greater accuracy at low load readings. Due to the characteristics of the parabolic contour of cam 12 in Figure 1, since a minimum vertical distance is required on each of the steps to insure a positive stop for plunger 10, the horizontal distance between successive steps increases at the lower end of the cam, corresponding to low load values, with the result that there are fewer steps on the cam between the zero and 50% load positions of the plunger than between 50% load and full load, and this condition is aggravated as lower loads are reached. The same limitation applies equally to the cylindrical cam of Figure 2 and the radial plate cams of Figures 4 and 5. Assuming the necessity of such steps or notches, accuracy can only be increased by increasing their number. This is accomplished in Figure 6 by employing two simultaneously operating cams 12ᵈ and 12ᵉ cam 12ᵈ corresponding to the cam of the preceding figures and being operated over the entire load range from zero to full load, while cam 12ᵉ is operative only from zero to, say 20% load. Both cams are preferably of the same size, their mechanical interconnection being such that cam 12ᵉ moves from zero thru its entire range while cam 12ᵈ moves from zero to a predetermined fractional part of full load range, this being, preferably up to 20% or one-fifth of full load. The cam of Figure 4 is shown as being so used in Figure 6, although it is understood that any of the cam types shown so far may be combined for this purpose by means of suitable linkage or gearing.

Referring to Figure 6, full load cam 12ᵈ and gear 53ᵈ are mounted on a common shaft. Rack 55ᵈ, carried on the float stem, meshes with gear 53ᵈ. Fractional load cam 12ᵉ and gear 61 are mounted on a common shaft. Sectors 62 and 63 are mounted on another common shaft. Rack 55ᵉ, carried on the float stem, meshes with sector 63 and sector 62 meshes with gear 61. After the float stem has risen to a point where cam 12ᵈ has turned thru 20% of its range, cam 12ᵉ has turned thru its complete range, due to the multiplying action of gear 61 and sector 62. Further upward motion of the float stem will continue rotation of the full load cam 12ᵈ, whereas the smooth portion 64 of rack 55ᵉ will slide along the smooth convex surface 65 and the edge of the last tooth of sector 63, without causing any further rotation of sector and consequently without further rotation of cam 12ᵉ. On the return travel of the float stem, spiral spring 66 provides for positive reengagement of sector 63 and rack 55ᵉ. It will be evident from the figure that cam 12ᵉ must make less than one revolution, to prevent contact between plunger 10ᵉ and cam 12ᵉ at higher loads with consequent falsification of the registration.

Also in Figure 6, gear 67 and arm 68 are mounted on a common shaft. Plunger 10ᵈ is reciprocated by motor 3 (Fig. 1) and plunger 10ᵉ is reciprocated by the connection comprised by arm 68. Forward motion of plunger 10ᵈ to the right causes arm 68 to swing to the right by means of pin and slot connection 69. The motion of arm 68 is communicated to plunger 10ᵉ by means of slot or notch 70 engaging pin 71. Since the angular speed of cam 12ᵉ is greater than that of cam 12ᵈ, the steps in the contour of cam 12ᵉ will recede inward at a faster rate than will those of cam 12ᵈ, consequently the forward speed of plunger 10ᵉ must be greater than the forward speed of plunger 10ᵈ in a ratio which is equal to the angular speed ratios of cams 12ᵉ and 12ᵈ. This ratio is obtained by suitably proportioning the effective lever arm length between the pivot of the arm 68 and pin 71, and between that pivot and pin at 69. To prevent further motion of plunger 10ᵉ beyond the limit set by cam 12ᵉ, slot or notch 70 is cut open at the extreme end of arm 68 so that when said limit is reached, the rear or pushing end 72 is of such a length that it will disengage pin 71, thereby permitting further motion of arm 68 to the full load position. On the return motion of arm 68, the extra length of the forward end 73 of slot will cause positive reengagement of the slot and pin 71. During the low load position, in which it is desired to govern the travel of plunger 10ᵈ entirely by means of cam 12ᵉ, cam 12ᵈ is cut away so that plunger tip 11ᵈ will contact cam 12ᵈ only when cam 12ᵉ has turned thru its complete range. During this interval, contact between plunger mechanism and cams is entirely thru plunger tip 11ᵉ.

A modification of the mechanism connecting the two plunger rods in Figure 6 is shown in Figure 7. Sector 75 and gear 74 are mounted on a common shaft. Rack carried on full load plunger rod 10ᶠ meshes with gear 74. Sectors 76 and 77 are mounted on common shaft. Rack, carried on fractional load plunger 10ᵍ, meshes with sector 77. Motion of plunger 10ᶠ is then communicated to plunger 10ᵍ thru gear 74, sectors 75, 76 and 77. When plunger 10ᶠ has completed a predetermined fractional part of its stroke, the smooth convex surface 78 of sector 76 will slide along the edge of the last tooth and the convex surface 79 of sector 75 without causing any further rotation of sector 76 and consequently without causing further motion of plunger 10ᵍ, which will have reached the limit of its travel. The spiral spring 80 will then cause positive reengagement of sectors 76 and 75 on the return travel of plunger 10ᶠ.

A modification of the mechanism connecting the two cams in Figure 6 is shown in Figures 8 and 9. Gears 81 and 82 are mounted on a common shaft. Cam 12ʰ and pinion 83 rotate as one unit, being threaded internally and turning on the fixed screw 84. Gear 81 meshes with pinion 83, which is sufficiently long to remain always in mesh therewith, and rack 55ʰ, carried on float stem, meshes with gear 82. Only the fractional load cam 12h is shown in Figures 8 and 9 and the connection to the full load cam at the upper end of the float stem being the same as in Figure 6. The construction of Figures 8 and 9 permits the full load and fractional load cams to be interconnected at all times, without temporary disengagement of their connecting drive. In this modification, slot 70 is made the same as slot 69 in Fig. 6. Cam 12h is bent into a helical form having the same pitch as the fixed screw 84, so that during its entire range the steps on cam 12h will be able to contact the plunger tip 11h for the full axial width of said steps. As the float stem continues to rise, further rotation of cam 12h will cause it, together with pinion 83, to progress axially along screw 84 so that at the end of one complete revolution the cam is completely to one side of plunger tip 11h, said process continuing as long as the float stem continues to rise. On the downward motion of the float stem as the load drops, cam 12h will again progress along screw 84 and will be brought into position opposite plunger tip 11h, remaining in said operating position only throughout the low load operating range.

The device shown in Figure 6, with its modifications shown in Figures 7, 8 and 9, is primarily designed to increase the number of teeth or steps in the cam at low loads. It will be evident to those skilled in the art that in actual construction the steps in all of the cams shown in Figures 1 to 9 inclusive may be made much smaller and more closely spaced than shown in the figures, their smallness being limited only by the necessity of making a positive contact with the edge of the plunger rod tip.

Figure 10 shows a means whereby the device may have its function combined with that of my pressure compensating meter. The device shown in Figure 10 is mainly identical with that of Figure 1, except that the register gear train is omitted, registration being accomplished on the pressure compensating meter. As in Figure 1, the magnitude of the periodic reciprocating motion of the plunger rod is limited by the contour of cam 12. The motion of rack 13 is transmitted to sector 14, arm 16, and segment 17, which are rigidly connected as one unit and rotate freely on shaft 15 pawls 19 being pivotally mounted on segment 17. Ratchet wheel 18 and cam 85 rotate together and are fastened to shaft 15, their periodic angular advance being in a counter-clockwise direction, as shown in the figure. Mercury switch 86 is supported in holder free to swing about axis 87. An arm, fastened to the holder, terminates in cam follower 88. As cam 85 rotates, its contour will periodically raise cam follower 88, thereby tilting mercury switch 86 so that the mercury will flow to the left-hand end of switch, making an electrical connection between electrical contacts 89. Figure 10 shows the device in the closed contact position. Upon closing said contact, an impulse is transmitted to the pressure compensating meter and is registered thereon. After the high point of one of the teeth on cam 85 has passed cam follower 88, the latter will fall radially inward toward shaft 15, thereby tilting mercury switch 86 in the opposite direction, and opening the electrical contact. It will be seen that the number of electrical impulses transmitted in a given time interval by mercury switch 86 is proportional to the number of revolutions of cam 85 during the said time interval, which in turn is proportional to the rate of steam flow.

Figure 11 shows a modification whereby the device of Figure 1 is combined with my pressure compensator in a single meter housing. The pressure compensator float mechanism consists of a cylindrical mercury container 90 separated from walls 91 of the meter housing. The figure shows the pressure compensator float mechanism to the left of the differential pressure float chamber 34. The pressure compensator mercury container consists of annular chamber 90 whose lower part is filled with mercury and whose upper part 92 contains an entrapped gas, such as air, which is noncondensible at ordinary temperatures; a large cylindrical chamber 93 and a smaller cylindrical chamber 94. Float 95 rides on the mercury column in the latter chamber, which is open at its lower end and communicates with chamber 90. The upper end of chamber 94 opens directly into chamber 93, which in turn is open at the top. Space 96 and chambers 93, 94, 35 and 36, below the oil in the housing, and above the mercury levels in said chambers, are filled with water. It will be understood that the meter body above is filled with oil. The mercury container 90 is arranged to be vertically adjustable while in service by means of a threaded projecting stem, lock-nut and pressure-tight cap, similar in every respect to the vertical adjustment provided for the piston 38 of the differential pressure meter float chamber 34.

Float 95 is prevented from rising out of chamber 94 upon release of pressure by stops 97. The vertical motion of float stem 98, moving in guide 99, is translated into angular motion of cam lever 100 and pivotal cam 101, by means of slot and pin connection 102. Cam follower 103, contacting the surface of cam 101, is rigidly attached to bar 104 which forms a connecting yoke between the two bearings 105. The latter are pivotally connected to arms 106 which swing about fixed bearings. The rising and falling of cam follower 103 with variations in pressure, due to the movement of float 95, will then cause connecting bar 104 and bearings 105 to change position, always keeping parallel to their original horizontal alignment, and carrying with them auxiliary shaft 107, which is free to move lengthwise thru bearings 105.

Plunger shaft 10 receives a periodic axial reciprocating motion from a driving motor, similar to the arrangement of Figure 1, said motion being transmitted by means of rack 13, sector 14 and arm 16 to a ratchet wheel mechanism and thence to a set of register dials as an uncompensated steam flow reading, the arrangement being similar to the device shown in Figure 1. The motion of plunger 10 is transmitted to lever 108 by means of pin and slot connection 109. Lever 108 is free to swing about fixed bearing, and its motion is transmitted to auxiliary shaft 107 by means of slot and pin connection 110. The degree of motion of plunger 10 and shaft 107 will then always be in a definite ratio depending upon the relative length of the effective lever arm to the pin and slot connections 109 and 110 a vertical displacement of shaft or rod 107 either up or down will vary the above ratio. Rack 111, mounted on shaft or rod 107, engages gear 112 which is on shaft 113, journaled in bearings. In order to keep rack 111 and gear 112 constantly in mesh at all positions of rack 111, the axial length of gear 112 is greater than the width of the face of rack 111. The oscillating motion of gear 112 is then transmitted by a ratchet wheel mechanism similar to that shown in Figure 1, to a second set of register dials as a compensated steam flow reading.

The device of Figure 11 is shown at the zero or return position of plunger 10. In this position lever 108 and shaft 113 are parallel, so that a shift in position of auxiliary shaft 107, due to a variation in steam pressure at this time, will not cause motion of gear 112 and consequent registration independently of the motion of plunger 10. If a compensated reading only is desired, rack 13, sector 14 and all the associated ratchet wheel and register gear mechanism may be omitted.

Counter-weights attached to arms 106, almost wholly compensate for the combined weight of arms, bearings 105, yoke 104, and shaft 107 so that the necessary work done by cam 101 in raising cam follower 103 shall be a minimum.

To facilitate adjustment of the mechanism, markings 12A may be attached to the differential pressure cam 12 and markings 101A to the pressure compensating cam 101 (Figure 11). Said markings co-operate with fixed guide 27 and cam follower 103, respectively. Said scales are preferably mounted adjacent to the register dials of the meter and being visible thru the cover glass. The scale pertaining to the differential pressure cam is marked to indicate the proper zero load position of said cam, while the scale pertaining to the pressure compensating cam is directly calibrated to read in pounds pressure.

In the modification shown in Fig. 11, pipe 31 communicates with the space between piston 38 and the bottom of the chamber.

In operation, the mercury chambers are filled with mercury to a predetermined height or level, and the rest of the space within the meter housing is filled with electric insulating oil, which also acts as a lubricant for the various moving parts of the meter mechanism. Before installation, and with both upstream and downstream connecting pipe taps 31 and 32 open to the atmosphere (giving an equalized pressure condition corresponding to zero load), the position of the pointer on the scale is noted, and if there is a deflection from the zero indication, the piston forming the bottom of the chamber is raised or lowered until zero load position is correctly indicated. The same procedure is followed for adjusting the position of the float and cam of Figure 1, which does not contain the pressure compensating mechanism.

To adjust the pressure compensating mechanism of Figure 11, oil pressure with a test pressure gauge is applied to the upstream pipe tap (the downstream or low pressure pipe being temporarily capped) and the reading of the pointer attached to the pressure compensating cam is noted; if said pressure reading is not the same as that indicated on the test gauge, the entire mercury chamber of the pressure compensating mechanism is adjusted up or down by means of the threaded adjusting stem underneath until the pointer indicates the correct pressure.

After both load and pressure adjustments have been made, the sealing caps underneath the mercury chambers are screwed into place and the device is ready for installation. The steam pressure acting on the space within the meter compresses the gas at 92, forcing the mercury level from chamber 94 down to chamber 90, within the operating range of float. The condensed water accompanying the steam will eventually displace all oil below the level 114. Operation of the meter will then commence as soon as motor 3 is connected to a source of electric current.

Although for clarity of illustration my invention has been shown as consisting of a rectangular case or shell containing the greater part of the mechanism, with a set of cylindrical casings containing the float chambers, nevertheless it will be understood by those skilled in the art that the general shape of the meter housing may be considerably altered without departing from the spirit of my invention. For example, the entire mechanism may be enclosed in a cylindrical body as shown in Fig. 15 at 1A, as in the case of my pressure compensators.

Mercury is preferably used as the float actuating liquid in the differential pressure float chamber, since for the pressure differentials encountered in practise the use of any other common liquid of lesser density would cause an excessively long vertical travel of the differential float and cam between zero and the end of the operating range. In the case of the pressure compensator, any other liquid which will not be diluted or added to by extraneous fluids may be used, the exact density of said liquid being immaterial, since with the comparatively large operating pressure encountered in service, the level of the liquid in the compensator float chamber is determined mainly by the compressibility of the gas in the space 92.

Figure 12:
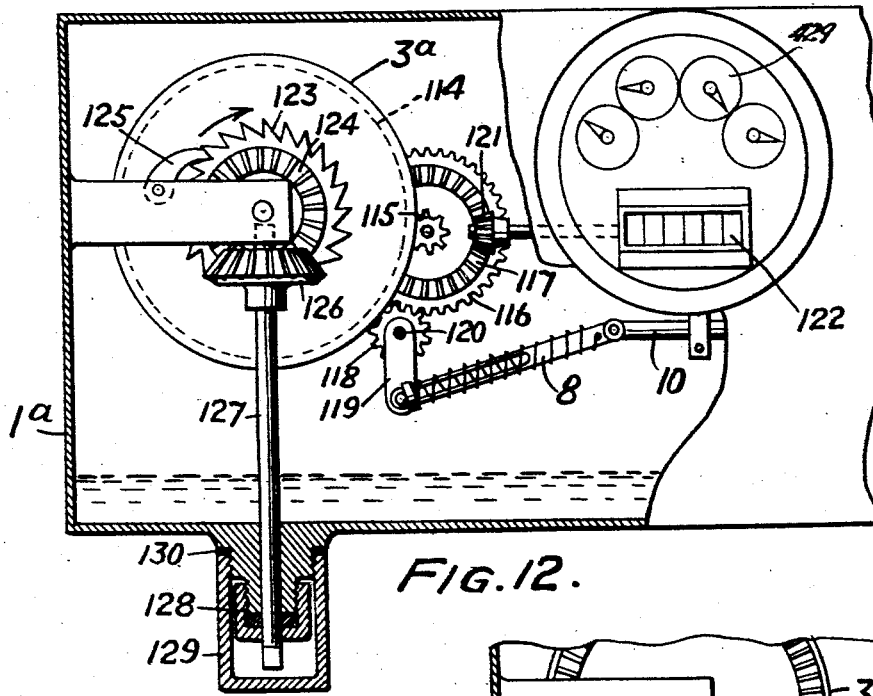
Figure 12 is a modification of Figure 1, in which the electric motor drive is replaced by a spring-driven mechanism.

Figure 12 shows a modification of the driving mechanism of Figure 1, which eliminates the necessity for a source of electric current to actuate the registration mechanism. A spring-wound motor 3ᴬ imparts its motion to a driving gear 114 (shown in the figure behind the main body of the spring motor), said gear meshing with pinion 115. Pinion 115, gear 116 and bevel gear 117 are mounted on common shaft. Gear 116 meshes with gear 118, the latter gear being mounted with arm 119 on common shaft 120. The rotation of gear 118 imparts a reciprocating motion to connecting rod 8 and plunger 10 in a manner similar to the device of Figure 1. The speed of the mechanism is controlled by a speed governor (not shown) preferably of the escapement wheel type.

Due to the fact that the speed of a spring-driven mechanism gradually becomes less as unwinding of the spring proceeds, the revolutions of gear 118 will not always occur at uniformly spaced time intervals. To avoid the more expensive arrangements which are necessary to compensate for diminishing spring power in an accurate time-keeping device, Figure 12 shows a definite and reliable manner in which such variations may be compensated for. Bevel gear 117 meshes with bevel pinion 121, the latter being mounted on the shaft of revolution counter 122. The gear ratio between bevel gears 117 and 121 is preferably the same as the gear ratio between gears 116 and 118, so that for each complete revolution of gear 118, the revolution counter 122 shall register one additional digit. The difference between the readings of counter 122 at two separate times will then indicate the number of oscillations of plunger 10 during this interval. Knowing from preceding tests on the meter before being installed in service what the normal number of such oscillations should be during a given unit of time, and by making note of the actual elapsed time between two successive readings of the steam consumption, then by dividing said number of oscillations as recorded on counter 122 by the expected normal number during said time, a ratio or percentage will be obtained which, when divided into the steam consumption indicated on dials 629 during the same time, will give the true steam consumption. The above procedure, will make it possible also to allow for possible stoppage of the spring mechanism during a meter reading period.

In the device shown in Figure 12, the spring motor is wound up at intervals manually. Ratchet wheel 123 and bevel gear 124 are mounted as a unit on the shaft of the spring motor 3ª, the clockwise rotation of said gear causing the spring to be wound up. Pawl 125, catches in the teeth of ratchet wheel 123 and prevents unwinding. Bevel gear 126, meshing with bevel gear 124, is mounted on shaft 127 which is journaled at its upper end in a bearing, the lower end of said shaft passing thru a stuffing box 128, said stuffing box permitting rotation of shaft 127 with a minimum loss of fluid due to leakage. The lower end of shaft 127 is squared to permit attaching a portable handle (not shown) whereby the device may be wound up.

In Figure 12, the body 1ª of the meter is shown as being sufficiently deep so that the lower part contains water, the water level being at the same height as the water level of Figure 1, in order that any leakage thru the stuffing box will be water, which is automatically replaced by further condensation in the pipes connecting to the steam line, rather than the insulating oil with which the upper part of the meter body is filled. Such leakage will, however, occur only at such times as the device is wound up; the lower part of the meter housing having an extension with an externally threaded portion to which the packing gland of the stuffing box is screwed, and another externally threaded portion of larger diameter to which is screwed a cover or cap 129, with ring gasket 130, placed between cap and shoulder, making a pressure tight seal.

Figure 13:
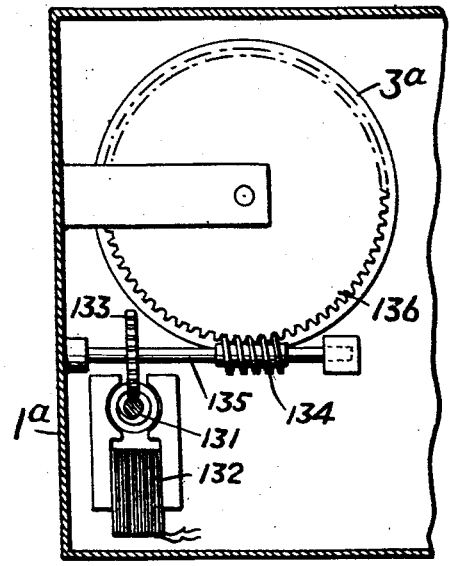
Figures 13 and 14 are modifications of Figure 12.

Figure 13 is a modification of Figure 12, in which the spring motor is continuously wound up by an auxiliary electric motor. Worm 131, mounted on the shaft of electric motor 132, meshes with worm gear 133. Gear 133 and worm 134 are mounted on shaft 135 which is journaled in bearings. Worm 134 meshes with worm gear 136, the latter being fastened to the shaft of spring motor 3ª. The rotation of motor 132 will then cause rotation of gear 136 and consequent winding up of the spring motor. It will be evident to those skilled in the art that the driving torque of electric motor 132 can be so adjusted that no damage will result to the gear train between said motor and spring motor 3ª when the latter is completely wound up, and that, moreover, the normal speed of gear 136 can be designed so as to be only slightly in excess of the normal unwinding speed of the spring contained within spring motor 3ª, so as to maintain the speed of electric motor 132 near its normal value. The reduction gearing shown in the figure should preferably contain one or more worm gear drives, since such a drive is in general irreversible, if the worm is made with a proper pitch, so that in case of interruption to the electric current supply, there will be no tendency for the spring to unwind by driving the electric motor backwards. With the construction shown in the figure, therefore, the ratchet and pawl of Figure 12 may be omitted. The connecting mechanism between the spring motor and pusher rod is understood to be the same as in Figure 12. The modification I have shown in Figure 13 is one of greatest accuracy and reliability, since with the spring motor maintained at or near the maximum wound up condition at all times, its unwinding or driving speed will be very nearly uniform; while said spring motor will continue to provide impulses to the registering mechanism during protracted periods of interruption to the electric current, if any such occur. It will be understood that the application of an auxiliary electric motor to the spring motor may be accomplished in several ways, one of which is shown in Fig. 16. This is an arrangement whereby the tension of the spring within the spring motor actuates a switch or contact in such a manner that the electric motor will wind up the spring whenever the tension of said spring falls below a predetermined value. As shown in greater detail in Fig. 16, this modification consists of a casing 1ª containing a spring motor 3ª of which the spring exerts a torque in a counter-clockwise direction on the gear 136. Worm 131, connected to the shaft of the rotor of motor 132, meshes with worm-wheel 133 on shaft 135. Worm 134 meshes with gear 136 and is keyed on shaft 135 by means of key 212. Spring 200 stresses worm 134 toward collar 211 by the reaction of spring 200 against collar 213. Contact 203 is mounted on spring 204 for engagement or contact with 205 which is mounted on a yoke pivoted at 202, the upper end of the yoke engaging in a notched collar on worm 134. The yoke carries an electro-magnet 206 co-operating with armature 207 carried by spring 204. The operation of this modification is as follows:

When the spring of motor 3ª becomes too weak to resist the clockwise thrust of spring 200, spring 200 pushes worm 134 over against collar 211 and thus closes contacts 203 and 205. Current is conducted through lead 208, motor 132, lead 209, contacts 203 and 205, electro-magnet 206, and back to the source through lead 210. Motor 132 is thus actuated by spring motor 3ª to wind up the spring. The increasing tension of the spring of motor 3ª becomes strong enough to overcome the tension of spring 200 and worm 134 is slid to the right, which tends to break contacts 203 and 205. However, due to the attraction of electro-magnet 206 for armature 207, spring-support 204 is bent to the right until its tension becomes sufficient to overcome the slight attraction of magnet 206, at which time spring 204 breaks contacts 203 and 205 with a snap, which prevents arcing.

Figure 14:
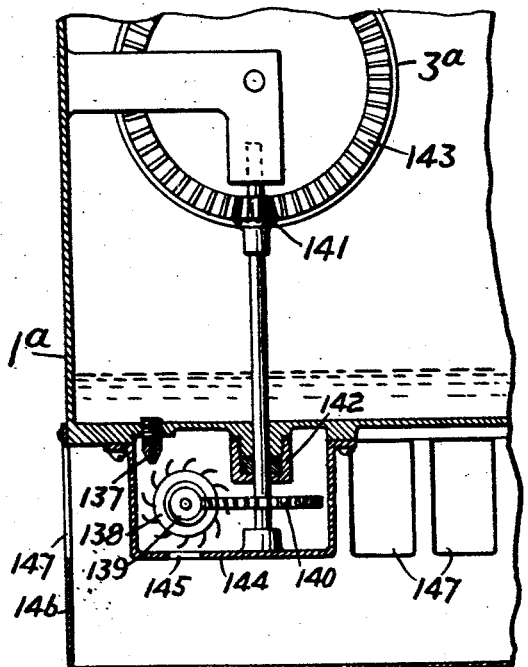

Figure 14 is a modification of Figure 13 in which the spring motor is continuously wound up by a water wheel which is actuated by the water condensed within the body of the meter. A discharge nozzle 137, having a relatively fine bore, is screwed into the bottom of meter casing 1ª. Water from nozzle impinges against the buckets of water wheel or turbine 138. Worm 139 and water wheel 138 are mounted on common shaft. Worm 139 meshes with worm gear 140, the latter being mounted, together with bevel gear 141, on a common shaft 1852, said shaft being journaled at its ends. The bottom of meter casing 1ª terminates in a projection having an externally threaded portion to receive a stuffing box cover 142, said stuffing box serving as a seal to permit the rotatable shaft to extend thru the meter housing with a minimum amount of leakage of water past the bearing surface within said projection. Bevel gear 141 meshes with bevel gear 143, the latter being mounted on the shaft of spring motor 3ª so that rotation of bevel gear 143 will wind up the spring motor. The lower bearing of the vertical shaft is a part of water wheel chamber or housing 144 which is fastened to the meter housing. Opening 145 in the bottom of chamber 144 permits the escape of water discharged from the water wheel buckets, said water falling into tank 146 which is fastened to meter housing. Tank 146 is open to the atmosphere thru openings 147, to provide for escape of steam in case of accidental leakage from the bottom of the meter. Pipe 148 communicates between tank 146 and a nearby drain for disposing of the water discharged from the water wheel.

In Figure 14, the meter body is filled with insulating oil above the level of the water, while water occupies the space below this line. To provide a supply of water for steam meters, present practise in the art is to install reservoirs or chambers in the pipes transmitting pressure from the steam line to the meter, said reservoirs being of comparatively large area and provided further with a set of radiating fins mounted on said tubes to dissipate the heat of the steam and provide for condensation. It will be evident to those skilled in the art that said reservoirs and fins may be made of any size necessary in order to assure a constant supply of water to replace the water withdrawn from the meter casing by the operation of the water wheel or turbine.

Any of the methods of furnishing the motive power above illustrated in Figures 1, 12, 13 and 14 may obviously be combined with any of the cam types shown in Figures 1, 3, 5, 6, 7 and 9 to produce a steam meter operating on the principle herein described. It will likewise be evident that the plunger stroke counter 122 of Figure 12 may be adapted to any of the various types of my device in order to increase the accuracy and reliability of the meter.

It will be obvious to those skilled in the art that the invention is not limited in respect to details of construction and arrangement or to matters of mere form or otherwise than the prior art may require.

I claim:—

1. A fluid meter comprising in combination, an integrating register, a motor, reciprocating compressible means including a pawl-and-ratchet driven by said motor and driving the register and also including a stroke adjustment, a step cam device for limiting the stroke of said means by compression thereof, and two float mechanisms whereof one is connected with and adapted to position said cam device in response to differential pressure at an orifice and whereof the other is connected with said stroke adjustment and is responsive to inlet side pressure at the orifice.

2. A fluid meter comprising in combination, a pressure tight housing containing oil, a chamber depending from the housing and containing a supply of mercury, a partition separating the chamber into upper and lower parts, a tube extending through the partition and dipping into the lower part of the chamber, a supply of water above the partition and under the oil and on top of the mercury and in the tube, a supply of water below the partition and on top of the mercury, differential pressure taps to the respective supplies of water, a float in the tube and on the mercury, an integrating register, a motor, variable stroke mechanism operated by said motor and actuating the register step-by-step, and a step cam device actuated by the float and operative to limit the stroke of said mechanism.

3. A pressure tight housing containing a supply of oil, two mercury chambers depending from the housing and each containing a supply of mercury, each of said chambers being equipped with a partition and a tube extending through the partition and dipping into the mercury, a supply of water in the housing and under the oil and above the mercury in each tube, a supply of air trapped under the partition in one chamber above the mercury, a supply of water in the other chamber above the mercury and under the partition, a pressure tap to the water in the housing and a pressure tap to the water above the mercury in one of the chambers, an integrating register, a motor, variable stroke reciprocating means driven by said motor and driving the register, step-by-step, a float arranged in the other chamber and responsive to differential pressure and provided with a step cam cooperating with said reciprocating means to limit its stroke, and a second float in the one chamber responsive to inlet pressure and provided with connections for adjusting the stroke of said means whereby the register does respond to variation of inlet pressure at an orifice.

4. A fluid meter comprising, in combination, an integrating register, a motor arranged to actuate said register, adjustable means forming a connection between said motor and said register whereby said motor actuates said register, a cam controlling said adjustable means, first means controlling said cam, an orifice device controlling said first means in response to differential pressure at said orifice, second means controlling said adjustable means separately from said cam, and means controlling the position of said second means in response to inlet pressure at said orifice.

5. A fluid meter comprising, in combination, an integrating register, a motor arranged to actuate said register, adjustable means forming a connection between said motor and said register whereby said motor actuates said register, a cam controlling said adjustable means, first means controlling said cam, an orifice device controlling said first means in response to differential pressure at said orifice, second means controlling said adjustable means separately from said cam, means controlling the position of said second means in response to inlet pressure at said orifice, and an adjustable connection between said second means and said adjustable means, said adjustable connection being operatively located between said cam and said register.

6. A fluid meter comprising, in combination, an integrating register, a motor arranged to actuate said register, adjustable means forming a connection between said motor and said register whereby said motor actuates said register, a cam controlling said adjustable means, first means controlling said cam, an orifice device controlling said first means in response to differential pressure at said orifice, second means controlling said adjustable means separately from said cam, means controlling the position of said second means in response to inlet pressure at said orifice, and a second register arranged so as to be actuated by said motor under the control of said cam but independent of the control of said second means.

7. A fluid meter comprising in combination, a pressure tight housing containing oil, a chamber depending from the housing and containing a supply of mercury, a partition separating the chamber into upper and lower parts, a tube extending through the partition and dipping into the lower part of the chamber, a supply of water above the partition and under the oil and on top of the mercury and in the tube, a supply of water below the partition and on top of the mercury, differential pressure taps to the respective supplies of water, a float in the tube and on the mercury, an integrating register, a motor, variable-stroke mechanism operated by said motor and actuating the register step-by-step, a step cam device actuated by the float and operative to limit the stroke of said mechanism, an adjustable piston head forming the lower wall of the lower part of said chamber, and a connection from beneath said piston head to the exterior of the housing and serving for adjustment of said piston head.

8. A fluid meter comprising, in combination, an integrating register, a motor arranged to actuate said register, adjustable means forming a connection between said motor and said register whereby said motor actuates said register, a cam controlling said adjustable means, first means controlling said cam, a device controlling said first means in response to differential pressure at said device, second means controlling said adjustable means separately from said cam, and means controlling the position of said second means in response to inlet pressure at said device.

9. A fluid meter comprising in combination, a pressure-tight housing containing oil, a chamber depending from the housing and containing a supply of mercury, a partition separating the chamber into upper and lower parts, a tube extending through the partition and dipping into the lower part of the chamber, a supply of water above the partition and under the oil and on top of the mercury and in the tube, a supply of water below the partition and on top of the mercury, differential pressure taps to the respective supplies of water, a float in the tube and on the mercury, an integrating register, a motor, variable-stroke mechanism operated by said motor and actuating the register step-by-step, a step cam device actuated by the float and operative to limit the stroke of said mechanism, an adjustable piston head forming the lower wall of the lower part of said chamber, and a conduit from beneath said piston head to the interior of the housing.

WALTER C. WAGNER.